US008149355B2

(12) United States Patent
Kobayashi et al.

(10) Patent No.: US 8,149,355 B2
(45) Date of Patent: Apr. 3, 2012

(54) LIQUID CRYSTAL DISPLAY DEVICE COMPRISING COLOR POLARIZING PLATE

(75) Inventors: Kunpei Kobayashi, Tachikawa (JP); Toshiharu Nishino, Hamura (JP); Norihiro Arai, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 819 days.

(21) Appl. No.: 12/181,479

(22) Filed: Jul. 29, 2008

(65) Prior Publication Data
US 2009/0033838 A1 Feb. 5, 2009

(30) Foreign Application Priority Data

Jul. 31, 2007 (JP) ................................ 2007-199558

(51) Int. Cl.
*G02F 1/1335* (2006.01)
(52) U.S. Cl. ............................................ 349/97; 349/96
(58) Field of Classification Search ........................ None
See application file for complete search history.

(56) References Cited

U.S. PATENT DOCUMENTS

| 4,139,278 | A | * | 2/1979 | Matsumoto et al. | ............ | 345/94 |
| 6,359,671 | B1 | * | 3/2002 | Abileah | ...................... | 349/119 |
| 6,498,633 | B1 | | 12/2002 | Ozeki et al. | | |
| 2004/0100597 | A1 | * | 5/2004 | Fukuda et al. | ............... | 349/112 |

FOREIGN PATENT DOCUMENTS

| JP | 54-033049 A | 3/1979 |
| JP | 04-218025 A | 8/1992 |
| JP | 2002-221711 A | 8/2002 |
| JP | 2003-255327 A | 9/2003 |

OTHER PUBLICATIONS

Chinese Office Action dated Jun. 23, 2010 and English translation thereof, issued in counterpart Chinese Application No. 200810215457.9.
Japanese Office Action dated Jun. 9, 2009 and English translation thereof issued in a counterpart Japanese Application No. 2007-199558.

* cited by examiner

*Primary Examiner* — Lucy Chien
(74) *Attorney, Agent, or Firm* — Holtz, Holtz, Goodman & Chick, PC

(57) ABSTRACT

A liquid crystal display device includes a pair of substrates, electrodes formed on the opposing surfaces of the pair of substrates, and a liquid crystal layer twisted in the gap between the pair of substrates at a predetermined twisted angle. A normal polarizing plate to exhibit a polarizing function for the whole visible light is arranged on the outer surface of an observation side substrate in the pair of substrates. A color polarizing plate to exhibit a polarizing function for visible light of a wavelength band other than a specific wavelength band is arranged on the outer surface of the opposite side substrate in the pair of substrates. A reflecting plate to reflect light entering from the observation side toward the observation side is arranged on a surface of the color polarizing plate that is opposite to the surface that opposes the opposite side substrate.

14 Claims, 4 Drawing Sheets

LIQUID CRYSTAL DISPLAY DEVICE COMPRISING COLOR POLARIZING PLATE

CROSS-REFERENCE TO RELATED APPLICATIONS

This application is based upon and claims the benefit of priority from prior Japanese Patent Application No. 2007-199558, filed Jul. 31, 2007, the entire contents of which are incorporated herein by reference.

BACKGROUND OF THE INVENTION

1. Field of the Invention

The present invention relates to a liquid crystal display device that performs color display using a color polarizing plate.

2. Description of the Related Art

As a liquid crystal display device, one is known that comprises a color polarizing plate to exhibit a polarizing function for light of a wavelength band other than a specific band in a visible light band and that performs color display by means of wavelength light transmitted through the color polarizing plate (see Jpn. Pat. Appln. KOKAI Publication No. 2003-255327).

The conventional liquid crystal display device comprising the color polarizing plate can, however, perform simple two-color display using one of white and black, and color display via the color polarizing plate.

BRIEF SUMMARY OF THE INVENTION

A liquid crystal display device according to the first aspect of the present invention includes:

a pair of substrates including an observation side substrate and an opposite side substrate that are arranged to oppose each other at a predetermined gap;

a liquid crystal layer that is sealed in the gap between the pair of substrates and includes liquid crystal molecules that are twisted between the pair of substrates at a predetermined twisted angle;

electrodes that are respectively provided on inner surfaces of the pair of substrates that oppose the liquid crystal layer and to which a voltage to control an aligned state of the liquid crystal molecule is applied at opposing regions;

a normal polarizing plate that is arranged on an outer surface of the observation side substrate, and transmits a light component oscillating within a plane parallel to a direction of a predetermined transmission axis, and absorbs a light component perpendicular to the transmission axis, among wavelength light of a substantial whole band of a visible light band;

a color polarizing plate that is arranged on an outer surface of the opposite side substrate, and transmits a light component oscillating within an oscillation plane parallel to a predetermined transmission axis, and absorbs a light component perpendicular to the transmission axis, among wavelength light in a remaining band of the visible light band excluding a specific band; and a reflecting plate that is arranged on a surface of the color polarizing plate that is opposite to a surface that opposes the opposite side substrate and reflects light entering from the observation side to the observation side.

A liquid crystal display device according to the second aspect of the present invention includes:

a pair of substrates including an observation side substrate and an opposite side substrate that are arranged to oppose each other at a predetermined gap;

a liquid crystal layer that is sealed in the gap between the pair of substrates and includes liquid crystal molecules that are twisted between the pair of substrates substantially at a twisted angle of 90°;

electrodes that are respectively provided on inner surfaces of the pair of substrates that oppose the liquid crystal layer and to which a voltage to control an aligned state of the liquid crystal molecule is applied at opposing regions;

a normal polarizing plate that is arranged on an outer surface of the observation side substrate so that a transmission axis thereof is substantially parallel to an aligning direction of the liquid crystal molecules in the vicinity of the observation side substrate, and transmits a light component oscillating within a plane parallel to a direction of the predetermined transmission axis, and absorbs a light component perpendicular to the transmission axis, among wavelength light of a substantial whole band of a visible light band;

a color polarizing plate that is arranged on an outer surface of the opposite side substrate so that a transmission axis thereof is substantially parallel to the aligning direction of the liquid crystal molecules in the vicinity of the opposite side substrate, and transmits a linearly polarized light component parallel to the transmission axis, and absorbs a light component perpendicular to the transmission axis, among wavelength light in a remaining band of the visible light band excluding a band corresponding to red; and a reflecting plate that is arranged on a surface of the color polarizing plate that is opposite to a surface that opposes the opposite side substrate and reflects light entering from the observation side to the observation side.

Advantages of the invention will be set forth in the description that follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A, 3B, and 3C are schematic views each showing a change in polarized state of light entering from the observation side of one pixel portion of the liquid crystal display device, in which FIG. 3A shows a change in polarized state obtained when applying a voltage $V_1$, which aligns the liquid crystal molecules to an initial twisted state to be inclined most with respect to the substrate surfaces, across electrodes, FIG. 3B shows a change in polarized state obtained when applying a halftone voltage $V_2$, which aligns the liquid crystal molecules to a twisted state to rise obliquely with respect to the surfaces of substrates 1 and 2, across the electrodes, and FIG. 3C shows a change in polarized state obtained when applying a voltage $V_3$, which aligns the liquid crystal molecules to rise at an angle almost perpendicular to the substrate surfaces, across the electrodes;

DETAILED DESCRIPTION OF THE INVENTION

Figure 1:
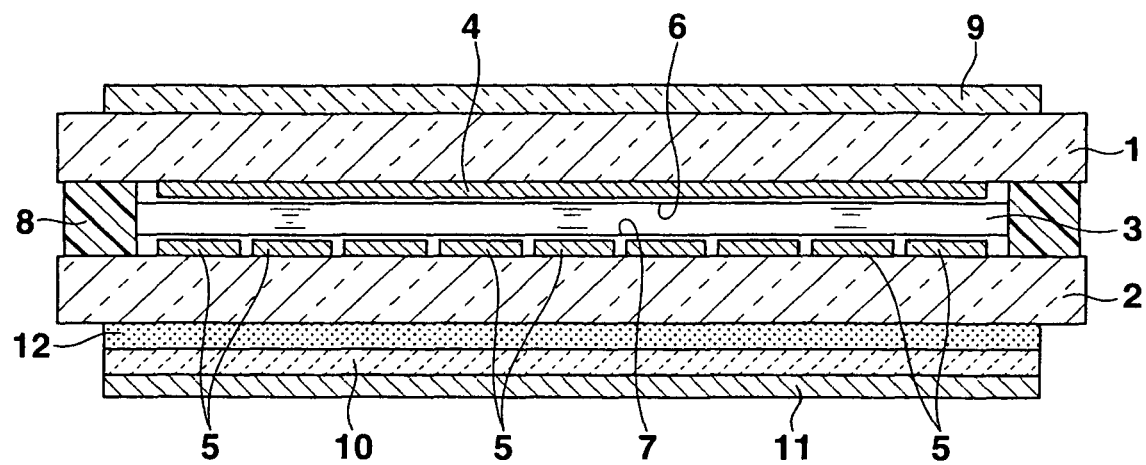
FIG. 1 is a sectional view of a liquid crystal display device according to an embodiment of the present invention.

FIG. 1 is a sectional view of a liquid crystal display device according to an embodiment of the present invention. As shown in FIG. 1, this liquid crystal display device comprises a pair of substrates 1 and 2 including the observation side (upper side in FIG. 1) transparent substrate 1 and the opposite side transparent substrate 2, and a liquid crystal layer 3 sealed in the gap between the pair of substrates 1 and 2. The transparent substrates 1 and 2 are arranged to oppose each other at a predetermined gap. The liquid crystal layer 3 includes liquid crystal molecules 3a (see FIGS. 3A, 3B, and 3C), which are twisted between the pair of substrates 1 and 2 at predetermined twisted angles. The pair of substrates 1 and 2 are respectively provided with transparent electrodes 4 and 5 on their inner surfaces opposing the liquid crystal layer 3. The opposing regions of the transparent electrodes 4 and 5 form pixel portions, in which the aligned state of the liquid crystal molecules 3a is controlled by an applied voltage. A normal polarizing plate 9 is arranged on the outer surface of the observation side substrate 1. The normal polarizing plate 9 is to transmit a light component oscillating within a plane parallel to the direction of a predetermined transmission axis, and to absorb a light component perpendicular to the transmission axis, among wavelength light of a substantial whole band of the visible light band. The outer surface of the opposite side substrate 2 is provided with a color polarizing plate 10 and a reflecting plate 11. The color polarizing plate 10 is to transmit a light component oscillating within an oscillation plane parallel to a predetermined transmission axis, and to absorb a light component perpendicular to the transmission axis, among the wavelength light in a remaining band of the visible light band excluding a specific band. The reflecting plate 11 is arranged on that surface of the color polarizing plate 10 that is opposite to the surface that the opposes the substrate 2, and is to reflect light entering from the observation side to the observation side.

The liquid crystal display device of this embodiment is an active matrix liquid crystal display device, which includes pixel electrodes 5 that is formed on the inner surface of the substrate 2 that is opposite to the observation side in a matrix fashion with being aligned in row and column directions, and a film-like opposed electrode 4 that is formed on the inner surface of the observation side substrate 1 corresponding to the aligned regions of the pixel electrodes 5. Although not shown in FIG. 1, TFTs (Thin Film Transistors) respectively connected to the pixel electrodes 5 are arranged on the inner surface of the opposite side substrate 2 corresponding to the pixel electrodes 5. Scanning lines to supply gate signals to the TFTs of the respective rows and signal lines to supply data signals to the TFTs of the respective columns are provided to the inner surface of the opposite side substrate 2 through the TFTs.

The pair of substrates 1 and 2 are respectively provided with aligning films 6 and 7 on their inner surfaces covering the electrodes 4 and 5, and the film surfaces of the aligning films 6 and 7 are rubbed in predetermined directions, subjected to the aligning treatment.

The pair of substrates 1 and 2 are bonded to each other through a frame-like seal member 8 formed to surround the aligned region of the pixel electrodes 5. The liquid crystal layer 3 comprising a nematic liquid crystal having a positive dielectric anisotropy is sealed in the region between the substrates 1 and 2 that is surrounded by the seal member 8.

The liquid crystal molecules 3a of the liquid crystal layer 3 are aligned in the vicinities of the pair of substrates 1 and 2 so that their molecular major axes are aligned with the aligning treatment directions (the rubbing directions of the aligning films 6 and 7) of the substrates 1 and 2, and are twisted between the pair of substrates 1 and 2 with a twisted angle corresponding to the angle of intersection of the aligning treatment directions (the rubbing directions of the aligning films 6 and 7) 1a and 2a (see FIG. 2) of the respective substrates 1 and 2.

The normal polarizing plate 9 has a transmission axis 9a (see FIG. 2) in a predetermined direction within a plane parallel to its plate surface. The normal polarizing plate 9 exhibits a polarizing function, for the wavelength light of the whole band of the visible light band, of transmitting light having an oscillation component in a direction parallel to the transmission axis 9a, and absorbing light having an oscillation component in a direction perpendicular to the transmission axis 9a.

The color polarizing plate 10 has a transmission axis 10a (see FIG. 2) in a predetermined direction within a plane parallel to its plate surface. The color polarizing plate 10 has a polarizing function, for the wavelength light of the remaining band of the visible light band excluding the specific band, of transmitting light having an oscillation component in a direction parallel to the transmission axis 10a, and absorbing light having an oscillation component in a direction perpendicular to the transmission axis 10a, and transmits the wavelength light of the specific band without polarization. The color polarizing plate 10 is, e.g., a polarizing plate to exhibit a polarizing function for the light of a wavelength band other than the red wavelength band in the visible light band, of transmitting a linearly polarized component that is parallel to the transmission axis 10a, and absorbing a light component perpendicular to the transmission axis 10a. This color polarizing plate 10 will be called a red polarizing plate hereinafter.

The normal polarizing plate 9 is arranged so that its transmission axis 9a is in a direction substantially parallel or perpendicular to the aligning direction of the liquid crystal molecules 3a in the vicinity of the observation side substrate 1. The red polarizing plate 10 is arranged so that its transmission axis 10a is in a direction substantially parallel or perpendicular to the aligning direction of the liquid crystal molecules 3a in the vicinity of the opposite side substrate 1.

Figure 2:
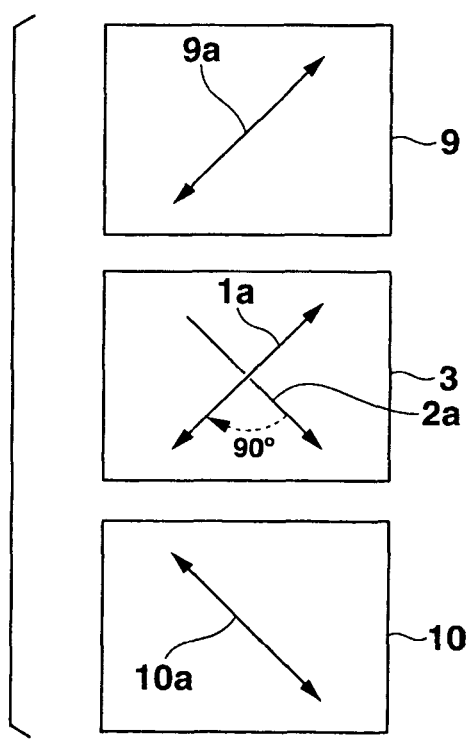
FIG. 2 shows the aligning treatment directions of a pair of substrates and the directions of the transmission axes of a normal polarizing plate and a red polarizing plate of the liquid crystal display device.

FIG. 2 shows aligning treatment directions 1a and 2a of the pair of substrates 1 and 2 and the directions of the transmission axes 9a and 10a of the normal polarizing plate 9 and the red polarizing plate 10. In this embodiment, the substrates 1 and 2 are arranged so that their aligning treatment directions 1a and 2a intersect substantially at the angle of 90°. The liquid crystal molecules 3a of the liquid crystal layer 3 are twisted between the pair of substrates 1 and 2 so that the twisted directions of the molecular orientations between the substrates 1 and 2 are twisted to form a twisted angle of substantially 90°, as indicated by a broken arrow in FIG. 2.

The value of a product $\Delta nd$ of a liquid crystal anisotropic refractive index $\Delta n$ and a liquid crystal layer thickness d of the liquid crystal layer 3 is set at such an angle that, in the initial alignment state in which the liquid crystal molecules 3a are twisted between the pair of substrates 1 and 2 at the twisted angle of substantially 90°, linearly polarized light having a wavelength of 550 nm is rotated through substantially 90° with reference to 550 nm as the halftone wavelength of the halftone wavelength band of the visible light band.

In this embodiment, the normal polarizing plate 9 and red polarizing plate 10 are arranged so that the respective transmission axes 9a and 10a are substantially perpendicular to each other, that the transmission axis 9a of the normal polarizing plate 9 is substantially parallel to the aligning treatment direction 1a of the observation side substrate 1, that is, the aligning direction of the liquid crystal molecules 3a in the vicinity of the observation side substrate 1, and that the transmission axis 10a of the red polarizing plate 10 is substantially parallel to the aligning treatment direction 2a of the opposite side substrate 2, that is, the aligned direction of the liquid crystal molecules 3a in the vicinity of the opposite side substrate 2.

Furthermore, this liquid crystal display device comprises a diffusion layer 12 that is arranged between the opposite side substrate 2 and red polarizing plate 10 to diffuse transmitted light.

This liquid crystal display device performs reflection display utilizing external light that is the light in the atmosphere where the liquid crystal display device is used. Light entering from the observation side, transmitted through the normal polarizing plate 9, liquid crystal layer 3, and red polarizing plate 10, reflected by the reflecting plate 11, and further transmitted through the red polarizing plate 10, liquid crystal layer 3, and normal polarizing plate 9 emerges to the observation side.

Figure 3A:
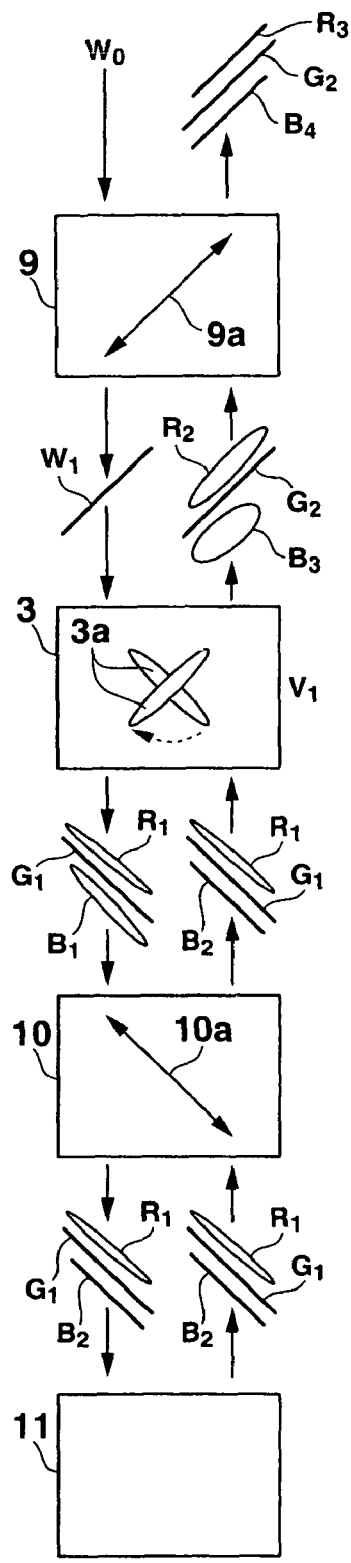
Figure 3B:
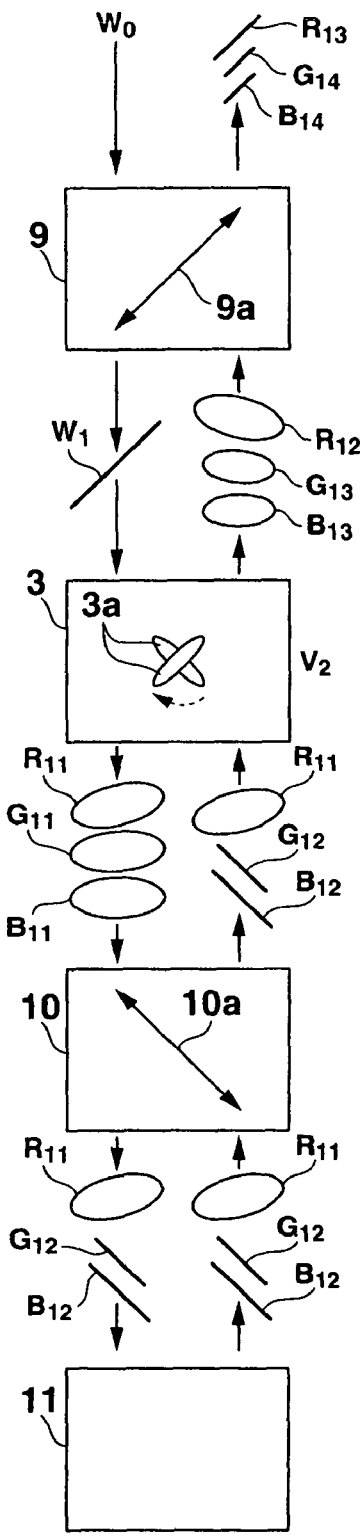
Figure 3C:
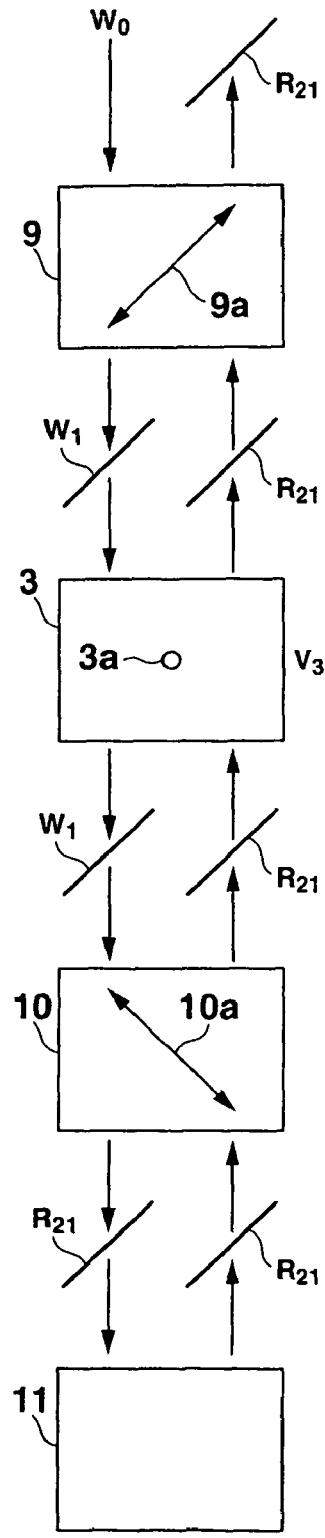

FIGS. 3A, 3B, and 3C are schematic views each showing a change in polarized state of light entering from the observation side of one pixel portion of the liquid crystal display device. FIG. 3A shows a change in polarized state obtained when applying a voltage (a voltage of substantially 0 V) $V_1$, which aligns the liquid crystal molecules 3a to an initial twisted state to be inclined most with respect to the surfaces of the substrates 1 and 2, across the electrodes 4 and 5. FIG. 3B shows a change in polarized state obtained when applying a halftone voltage $V_2$, which aligns the liquid crystal molecules 3a to a twisted state to rise obliquely with respect to the surfaces of the substrates 1 and 2, across the electrodes 4 and 5. FIG. 3C shows a change in polarized state obtained when applying a voltage $V_3$, which aligns the liquid crystal molecules 3a to rise at an angle almost perpendicular to the surfaces of the substrates 1 and 2, across the electrodes.

FIGS. 3A, 3B, and 3C also schematically show a shift in polarized state of light in the red band and light in the blue band with respect to the polarized state of light in the green band. This shift occurs due to the wavelength dependency of the double refraction birefringence function of the liquid crystal layer 3 when the value of Δnd of the liquid crystal layer 3 is set with reference to the wavelength of 550 nm (green) that is the center wavelength of the visible light band.

As shown in FIGS. 3A, 3B, and 3C, non-polarized white light $W_0$ entering the liquid crystal display device from the observation side is polarized by the normal polarizing plate 9, and enters the liquid crystal layer 3 as linearly polarized light $W_1$ parallel to the transmission axis 9a of the normal polarizing plate 9.

First, the polarized state of each portion will be described that is obtained when applying the voltage $V_1$, which aligns the liquid crystal molecules 3a almost to the initial twisted state to be inclined most with respect to the surfaces of the substrates 1 and 2, across the transparent electrodes 4 and 5.

As shown in FIG. 3A, the white linearly polarized light $W_1$ entering the liquid crystal layer 3 is rotated through substantially 90° by the double refraction birefringence function of the liquid crystal layer 3.

More specifically, of the white linearly polarized light $W_1$ entering the liquid crystal layer 3, the wavelength light in the intermediate wavelength band, that is, green light, is rotated through substantially 90°, and emerges from the liquid crystal layer 3 as linearly polarized light $G_1$ having a polarization plane in a direction parallel to the transmission axis 10a of the red polarizing plate 10. Wavelength light in a wavelength band shorter than the intermediate wavelength band, that is, blue light, and wavelength light in a wavelength band longer than the intermediate wavelength band, that is, red light, emerge from the liquid crystal layer 3 respectively as elliptically polarized light $B_1$ and elliptically polarized light $R_1$ having major axes in directions shifted in opposite directions (the clockwise direction and counterclockwise direction as viewed from the observation side) with respect to the polarization plane of the green linearly polarized light $G_1$ at an angle corresponding to the wavelength dependency of the double refraction birefringence function of the liquid crystal layer 3.

In this case, the shifts of the major axes and the lengths of the minor axes of the blue elliptically polarized light $B_1$ and red elliptically polarized light $R_1$ are very small. Hence, each of the blue elliptically polarized light $B_1$ and red elliptically polarized light $R_1$ can be regarded as linearly polarized light having a polarization plane substantially parallel to that of the green linearly polarized light $G_1$.

The green light $G_1$, blue light $B_1$, and red light $R_1$ rotated by the liquid crystal layer 3 enter the red polarizing plate 10. The green linearly polarized light $G_1$ having the polarization plane parallel to the transmission axis 10a of the red polarizing plate 10, light $B_2$, of the blue elliptically polarized light $B_1$, having an oscillation component parallel to the transmission axis 10a of the red polarizing plate 10, and the red elliptically polarized light $R_1$ that is not polarized by the red polarizing plate 10 are transmitted through the red polarizing plate 10 and reflected by the red polarizing plate 10.

Subsequently, the light $G_1$, light $B_2$, and light $R_1$ of the respective colors reflected by the reflecting plate 11 are transmitted through the red polarizing plate 10 to enter the liquid crystal layer 3 again, and are subjected to the double refraction birefringence function of the liquid crystal layer 3. More specifically, the green linearly polarized light $G_1$ forms linearly polarized light $G_2$ having a polarization plane rotated through substantially 90°. The blue light $B_2$ parallel to the transmission axis 10a of the red polarizing plate 10, and the red elliptically polarized light $R_1$ respectively form elliptically polarized light $B_3$ and elliptically polarized light $R_2$ slightly shifted in opposite directions with respect to the polarization plane of the rotated green linearly polarized light $G_2$ at an angle corresponding to the wavelength dependency of the double refraction birefringence function of the liquid crystal layer 3. Then, the polarized light $G_2$, polarized light $B_3$, and polarized light $R_2$ emerge from the liquid crystal layer 3.

The light $G_2$, light $B_3$, and light $R_2$ of the respective colors emerging from the liquid crystal layer 3 enter the normal polarizing plate 9. The green linearly polarized light $G_2$, light $B_4$, of the blue elliptically polarized light $B_3$, having an oscillation component parallel to the transmission axis 9a of the normal polarizing plate 9, and light $R_3$, of the red elliptically polarized light $R_2$, having an oscillation component parallel to the transmission axis $9a$ of the normal polarizing plate 9 are transmitted through the normal polarizing plate 9 and emerge to the observation side.

When compared to the blue elliptically polarized light $B_1$ and red elliptically polarized light $R_1$ that enter from the observation side and emerge from the liquid crystal layer 3 toward the red polarizing plate 10, the blue elliptically polarized light $B_3$ and red elliptically polarized light $R_2$ have longer minor axes. The light intensity of each oscillation component of the elliptically polarized light $B_3$ and elliptically polarized light $R_2$ that are parallel to the polarization plane of the green linearly polarized light $G_2$ is not largely different from the intensity of the green linearly polarized light $G_2$, and can accordingly be regarded substantially the same as that.

Hence, when applying the voltage $V_1$, which aligns the liquid crystal molecules $3a$ to the initial twisted state to be inclined most with respect to the surfaces of the substrates 1 and 2, across the transparent electrodes 4 and 5, light in which the green light $G_2$, blue light $B_4$, and red light $R_3$ have substantially the same intensity, emerges from the normal polarizing plate 9. The light $G_2$, light $B_4$, and light $R_3$ mix to display white.

The polarized state of each portion will be described that is obtained when applying the halftone voltage $V_2$, which aligns the liquid crystal molecules $3a$ to the twisted state to rise obliquely with respect to the surfaces of the substrates 1 and 2, across the transparent electrodes 4 and 5. As shown in FIG. 3B, of the white linearly polarized light $W_1$ transmitted through the normal polarizing plate 9 from the observation side and entering the liquid crystal layer 3, the green light, blue light, and red light are subjected to the double refraction birefringence function corresponding to the rise angle of the liquid crystal molecules $3a$ of the liquid crystal layer 3, and emerge from the liquid crystal layer 3 as elliptically polarized light $G_{11}$, elliptically polarized light $B_{11}$, and elliptically polarized light $R_{11}$, respectively.

When compared to the green linearly polarized light $G_1$, blue elliptically polarized light $B_1$, and red elliptically polarized light $R_1$ emerging from the liquid crystal layer 3 when applying the voltage $V_1$ across the transparent electrodes 4 and 5 as shown in FIG. 3A, the green elliptically polarized light $G_{11}$, blue elliptically polarized light $B_{11}$, and red elliptically polarized light $R_{11}$ are elliptically polarized light having major axes with different tilts and longer minor axes.

The green elliptically polarized light $G_{11}$, blue elliptically polarized light $B_{11}$, and red elliptically polarized light $R_{11}$ that have been subjected to the double refraction birefringence function of the liquid crystal layer 3 enter the red polarizing plate 10. Light $G_{12}$, of the green elliptically polarized light $G_{11}$, having an oscillation component parallel to the transmission axis $10a$ of the red polarizing plate 10, light $B_{12}$, of the blue elliptically polarized light $B_{11}$, having an oscillation component parallel to the transmission axis $10a$ of the red polarizing plate 10, and the red elliptically polarized light $R_{11}$ that is not polarized by the red polarizing plate 10 emerge from the red polarizing plate 10 and are reflected by the reflecting plate 11.

Hence, each of the light $B_{12}$ and light $G_{12}$ emerging from the red polarizing plate 10 is light having a light intensity lower than that of each of the green linearly polarized light $G_1$, blue elliptically polarized light $B_2$, and red elliptically polarized light $R_1$ shown in FIG. 3A.

The light $G_{12}$, light $B_{12}$, and light $R_{11}$ of the respective colors reflected by the reflecting plate 11 are transmitted through the red polarizing plate 10 and enter the liquid crystal layer 3 again, and emerge from the liquid crystal layer 3 as elliptically polarized light $G_{13}$, elliptically polarized light $B_{13}$, and elliptically polarized light $R_{12}$ according to the double refraction birefringence function corresponding to the rise angle of the liquid crystal molecules $3a$ of the liquid crystal layer 3, respectively.

The elliptically polarized light $G_{13}$, elliptically polarized light $B_{13}$, and elliptically polarized light $R_{12}$ of the respective colors emerging from the liquid crystal layer 3 and entering the normal polarizing plate 9 emerge from the normal polarizing plate 9 toward the observation side as light $G_{14}$, of the green elliptically polarized light $G_{13}$, having an oscillation component parallel to the transmission axis $9a$ of the normal polarizing plate 9, light $B_{14}$, of the blue elliptically polarized light $B_{13}$, having an oscillation component parallel to the transmission axis $9a$ of the normal polarizing plate 9, and light $R_{13}$, of the red elliptically polarized light $R_{12}$, having an oscillation component parallel to the transmission axis $9a$ of the normal polarizing plate 9, respectively.

Each of the green light, blue light, and red light emerging to the observation side, that is, the linearly polarized light $G_{14}$, linearly polarized light $B_{14}$, and linearly polarized light $R_{13}$ parallel to the transmission axis $9a$ of the normal polarizing plate 9 is light having a very low intensity. When applying the halftone voltage $V_2$, which aligns the liquid crystal molecules $3a$ to the twisted state to rise obliquely with respect to the surfaces of the substrates 1 and 2, across the transparent electrodes 4 and 5, the light exit rate becomes lowest, and substantially black is displayed.

The polarized state of each portion will now be described that is obtained when applying the voltage $V_3$, which aligns the liquid crystal molecules $3a$ to be substantially perpendicular to the surfaces of the substrates 1 and 2, across the transparent electrodes 4 and 5. As shown in FIG. 3C, the white linearly polarized light $W_1$ entering from the observation side and transmitted through the normal polarizing plate 9 is transmitted through the liquid crystal layer 3 without being subjected to the double refraction birefringence function, and enters the red polarizing plate 10. The red polarizing plate 10 absorbs green light and blue light of the white linearly polarized light $W_1$, and red light is transmitted through the red polarizing plate 10.

Red linearly polarized light $R_{21}$ transmitted through the red polarizing plate 10 is reflected by the reflecting plate 11, and transmitted through the red polarizing plate 10, liquid crystal layer 3, and normal polarizing plate 9 sequentially to emerge to the observation side.

Therefore, when applying the voltage $V_3$, which aligns the liquid crystal molecules $3a$ to be substantially perpendicular to the surfaces of the substrates 1 and 2, across the transparent electrodes 4 and 5, only the red linearly polarized light $R_{21}$ emerges to the observation side to display red.

Figure 4:
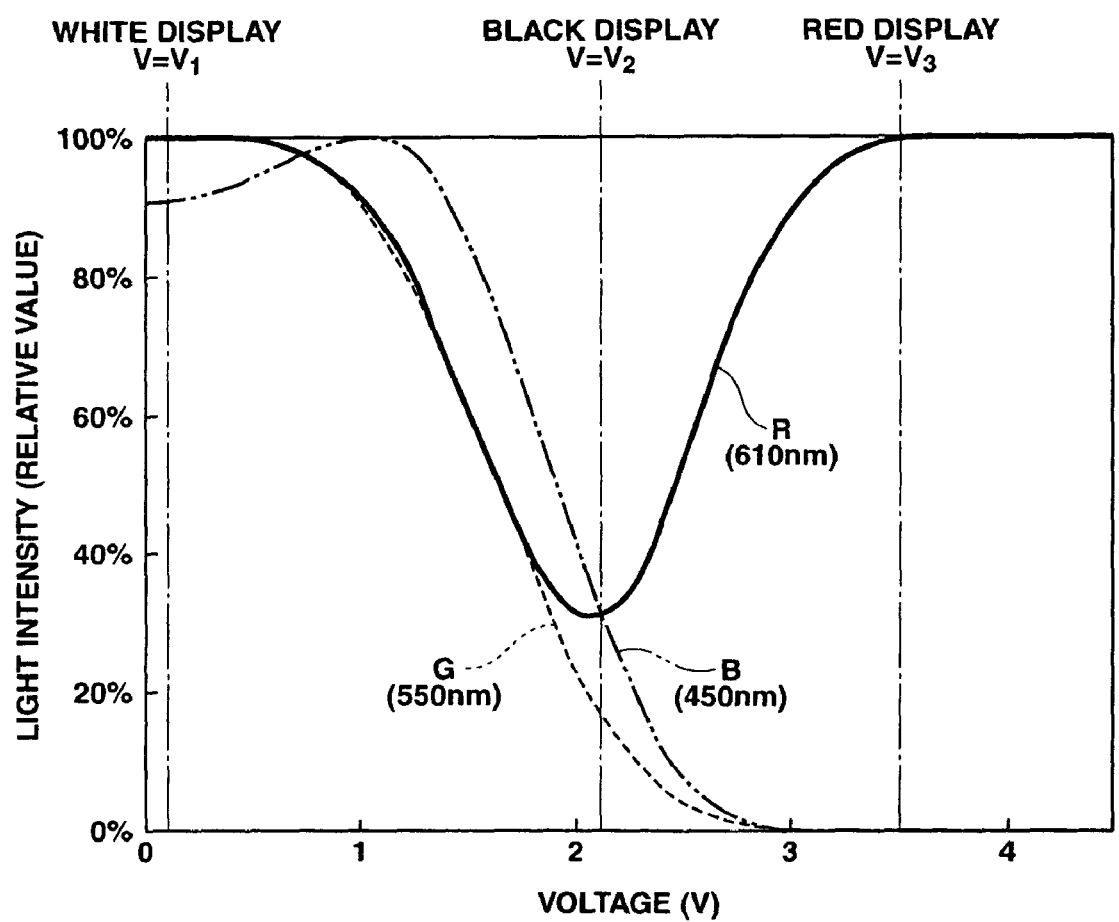
FIG. 4 shows the relationship between the voltage applied to the liquid crystal display device and the intensities of green light, blue light, and red light emerging to the observation side.

FIG. 4 shows the relationship between the voltage applied to the liquid crystal display device of this embodiment and the intensities of green light, blue light, and red light emerging to the observation side. As shown in FIG. 4, the liquid crystal display device of this embodiment becomes the brightest to display white when applying the voltage $V_1$, which aligns the liquid crystal molecules $3a$ to the initial twisted state to be inclined most with respect to the surfaces of the substrates 1 and 2, across the electrodes 4 and 5. The intensities of the green light, blue light, and red light become the lowest, when applying the halftone voltage $V_2$, which aligns the liquid crystal molecules $3a$ to the twisted state to rise obliquely with respect to the surfaces of the substrates 1 and 2, across the transparent electrodes 4 and 5, and the liquid crystal display device displays black. The liquid crystal display device displays red when applying the voltage $V_3$, which aligns the liquid crystal molecules 3a to be substantially perpendicular to the surfaces of the substrates 1 and 2, across the transparent electrodes 4 and 5.

In this manner, the liquid crystal display device comprises the liquid crystal layer 3, electrodes 4 and 5, normal polarizing plate 9, red polarizing plate 10, and reflecting plate 11. The liquid crystal layer 3 is sealed in the gap between the pair of substrates 1 and 2 and includes the liquid crystal molecules 3a that are twisted between the pair of substrates 1 and 2 at the predetermined twisted angle. The electrodes 4 and 5 are provided on the inner surfaces of the pair of substrates 1 and 2 that oppose the liquid crystal layer 3 and to which the voltage to control the aligned state of the liquid crystal molecules 3a at the opposing regions. The normal polarizing plate 9 is arranged on the outer surface of the observation side substrate 1 and exhibits a polarizing function for wavelength light of the substantial whole band of the visible light band. The red polarizing plate 10 is arranged on the outer surface of the opposite side substrate 2, and exhibits a polarizing function for wavelength light of the band other than the red wavelength band in the visible light band. The reflecting plate 11 is arranged on the surface of the red polarizing plate 10 that is opposite to the surface opposing the substrate 2, and reflects light entering from the observation side to the observation side. Hence, the liquid crystal display device can perform tricolor display using both white and black, and red via the red polarizing plate 10.

In the liquid crystal display device, the normal polarizing plate 9 is arranged so that its transmission axis 9a is in the direction substantially parallel to the aligning direction (the aligning treatment direction 1a of the observation side substrate 1) of the liquid crystal molecules 3a in the vicinity of the observation side substrate 1. Also, the red polarizing plate 10 is arranged so that its transmission axis 10a is in the direction substantially parallel to the aligning direction (the aligning treatment direction 2a of the substrate 2) of the liquid crystal molecules 3a in the vicinity of the opposite side substrate 2. Accordingly, the brightness of white display and that of red display can be increased.

Furthermore, in the liquid crystal display device, the liquid crystal molecules 3a of the liquid crystal layer 3 are twisted between the pair of substrates 1 and 2 at the twisted angle of substantially 90°. The normal polarizing plate 9 and red polarizing plate 10 are arranged so that their transmission axes 9a and 10a are substantially perpendicular to each other. Accordingly, the contrast of white display and that of black display can be increased.

The normal polarizing plate 9 and red polarizing plate 10 may be arranged so that the transmission axis 9a of the normal polarizing plate 9 is substantially perpendicular to the aligning direction of the liquid crystal molecules 3a in the vicinity of the observation side substrate 1, and that the transmission axis 10a of the red polarizing plate 10 is substantially perpendicular to the aligning direction of the liquid crystal molecules 3a in the vicinity of the opposite side substrate 2. In this case as well, white can be displayed by applying the voltage $V_1$, which aligns the liquid crystal molecules 3a to the initial twisted state to be inclined most with respect to the surfaces of the substrates 1 and 2, across the electrodes 4 and 5, black can be displayed by applying the halftone voltage $V_2$, which aligns the liquid crystal molecules 3a to the twisted state to rise obliquely with respect to the surfaces of the substrates 1 and 2, across the electrodes 4 and 5, and red can be displayed by applying the voltage $V_3$, which aligns the liquid crystal molecules 3a to be substantially perpendicular to the surfaces of the substrates 1 and 2, across the electrodes 4 and 5.

In the above embodiment, the normal polarizing plate 9 and red polarizing plate 10 are arranged so that their transmission axes 9a and 10a are substantially perpendicular to each other. Alternatively, the normal polarizing plate 9 and red polarizing plate 10 may be arranged so that their transmission axes 9a and 10a are substantially parallel to each other.

Figure 5:
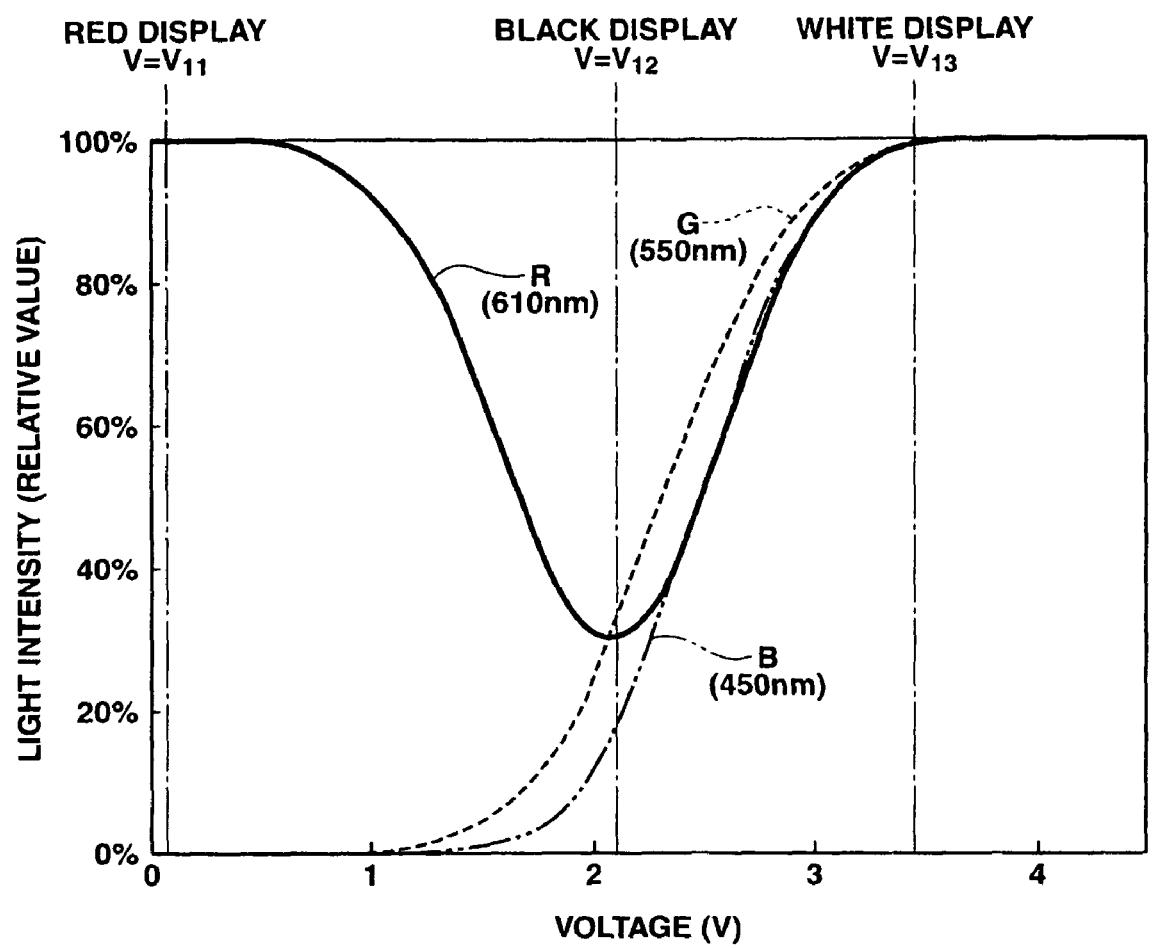
FIG. 5 shows the relationship between the voltage applied to the liquid crystal display device according to another embodiment in which a normal polarizing plate and a red polarizing plate are arranged so that their transmission axes are substantially parallel to each other, and the intensities of green light, blue light, and red light emerging to the observation side.

FIG. 5 shows the relationship between the voltage applied to a liquid crystal display device according to another embodiment in which a normal polarizing plate 9 and a red polarizing plate 10 are arranged so that their transmission axes 9a and 10a are substantially parallel to each other, and the intensities of green light, blue light, and red light emerge to the observation side. As shown in FIG. 5, the liquid crystal display device according to this embodiment displays red, black and white. Red is displayed when applying a voltage $V_{11}$, which aligns liquid crystal molecules 3a to the initial twisted state to be inclined most with respect to the surfaces of the substrates 1 and 2, across electrodes 4 and 5. Black is displayed when applying a halftone voltage $V_{12}$, which aligns the liquid crystal molecules 3a to the twisted state to rise obliquely with respect to the surfaces of the substrates 1 and 2, across the electrodes 4 and 5. White is displayed when applying a voltage $V_{13}$, which aligns the liquid crystal molecules 3a to be substantially perpendicular to the surfaces of the substrates 1 and 2, across electrodes 4 and 5.

The liquid crystal display device according to the above embodiment comprises the red polarizing plate as the color polarizing plate. The color polarizing plate is not limited to a red polarizing plate but may be a polarizing plate of another color such as green or blue. If the liquid crystal display device comprises, e.g., a green polarizing plate, it can perform tricolor display using both white and black, and green via the color polarizing plate.

As described above, a liquid crystal display device according to the present invention is characterized by comprising a pair of substrates including an observation side substrate and an opposite side substrate that are arranged to oppose each other at a predetermined gap, a liquid crystal layer that is sealed in the gap between the pair of substrates and includes liquid crystal molecules that are twisted between the pair of substrates at a predetermined twisted angle, electrodes that are respectively provided on inner surfaces of the pair of substrates that oppose the liquid crystal layer and to which a voltage to control an aligned state of the liquid crystal molecule is applied at opposing regions, a normal polarizing plate that is arranged on an outer surface of the observation side substrate, and transmits a light component oscillating within a plane parallel to a direction of a predetermined transmission axis, and absorbs a light component perpendicular to the transmission axis, among wavelength light of a substantial whole band of a visible light band, a color polarizing plate that is arranged on an outer surface of the opposite side substrate, and transmits a light component oscillating within an oscillation plane parallel to a predetermined transmission axis, and absorbs a light component perpendicular to the transmission axis, among wavelength light in a remaining band of the visible light band excluding a specific band, and a reflecting plate that is arranged on a surface of the color polarizing plate that is opposite to a surface that opposes the opposite side substrate and reflects light entering from the observation side to the observation side.

In the liquid crystal display device, preferably, the normal polarizing plate is arranged so that a transmission axis thereof is in a direction substantially perpendicular or parallel to an aligning direction of the liquid crystal molecules in the vicinity of the observation side substrate, and the color polarizing plate is arranged so that a transmission axis thereof is aligned in the direction substantially parallel or perpendicular to the aligning direction of the liquid crystal molecules in the vicinity of the observation side substrate.

Preferably, the liquid crystal molecules of the liquid crystal layer are twisted between the pair of substrates at a twisted angle of substantially 90°, and the normal polarizing plate and the color polarizing plate are arranged so that transmission axes thereof are substantially perpendicular to each other.

In addition, preferably, the liquid crystal molecules of the liquid crystal layer are twisted between the pair of substrates at a twisted angle of substantially 90°, and the normal polarizing plate and the color polarizing plate are arranged so that transmission axes thereof are substantially parallel to each other.

Preferably, the color polarizing plate comprises a red color polarizing plate having a polarizing function, for light of a wavelength band other than a wavelength band corresponding to red in the visible light, of transmitting a linearly polarized component parallel to the transmission axis and absorbing a light component perpendicular to the transmission axis, and is configured to perform display of three colors including red in a wavelength band not polarized by the red color polarizing plate, substantial white with which an light exit rate of a substantial whole band of the visible light wavelength band is high, and substantial black with which the light exit rate of the substantial whole band of the visible light wavelength band is low.

In addition, the liquid crystal display device according to the present invention, preferably, further comprises a diffusion film that diffuses incident light and outputs diffused light and is arranged between the opposite side substrate and the color polarizing plate.

A liquid crystal display device according to the present invention is characterized by comprising a pair of substrates including an observation side substrate and an opposite side substrate that are arranged to oppose each other at a predetermined gap, a liquid crystal layer that is sealed in the gap between the pair of substrates and includes liquid crystal molecules that are twisted between the pair of substrates at a twisted angle of substantially 90°, electrodes that are respectively provided on inner surfaces of the pair of substrates that oppose the liquid crystal layer and to which a voltage to control an aligned state of the liquid crystal molecule is applied at opposing regions, a normal polarizing plate that is arranged on an outer surface of the observation side substrate so that a transmission axis thereof is substantially parallel to an aligning direction of the liquid crystal molecules in the vicinity of the observation side substrate, and transmits a light component oscillating within a plane parallel to a direction of the predetermined transmission axis, and absorbs a light component perpendicular to the transmission axis, among wavelength light of a substantial whole band of a visible light band, a color polarizing plate that is arranged on an outer surface of the opposite side substrate so that a transmission axis thereof is substantially parallel to the aligning direction of the liquid crystal molecules in the vicinity of the opposite side substrate, and transmits a linearly polarized light component parallel to the transmission axis, and absorbs a light component perpendicular to the transmission axis, among wavelength light in a remaining band of the visible light band excluding a band corresponding to red, and a reflecting plate that is arranged on a surface of the color polarizing plate that is opposite to a surface that opposes the opposite side substrate and reflects light entering from the observation side to the observation side.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   a pair of substrates including an observation side substrate and an opposite side substrate that are arranged to oppose each other with a predetermined gap;
   a liquid crystal layer that is sealed in the gap between the pair of substrates and includes liquid crystal molecules that are twisted between the pair of substrates at a predetermined twisted angle;
   electrodes that are respectively provided on inner surfaces of the pair of substrates that oppose the liquid crystal layer and to which a voltage to control an aligned state of the liquid crystal molecules is applied at opposing regions;
   a normal polarizing plate that: (i) is arranged on an outer surface of the observation side substrate so that a first transmission axis of the normal polarizing plate is directed in a direction substantially perpendicular or parallel to an aligning direction of liquid crystal molecules in a vicinity of the observation side substrate, and (ii) transmits a light component oscillating in a direction parallel to the direction of the first transmission axis, and absorbs a light component oscillating in a direction perpendicular to the direction of the first transmission axis, among wavelength light of a substantial whole band of a visible light band;
   a color polarizing plate that: (i) is arranged on an outer surface of the opposite side substrate so that a second transmission axis of the color polarizing plate is directed in a direction substantially perpendicular or parallel to an aligning direction of liquid crystal molecules in a vicinity of the opposite side substrate, and (ii) transmits a light component oscillating in a direction parallel to the direction of the second transmission axis, and absorbs a light component oscillating in a direction perpendicular to the direction of the second transmission axis, among wavelength light in a band of the visible light band excluding a specific band; and
   a reflecting plate which is arranged on a surface of the color polarizing plate that is opposite to a surface that faces the opposite side substrate, and which reflects light entering from the observation side to the observation side,
   wherein:
      (i) when the voltage applied between the electrodes is at a first voltage, the liquid crystal display device displays a white color corresponding to the substantial whole band of the visible light band, in accordance with one of an optical rotation by the liquid crystal layer and a cancelling of the optical rotation by the liquid crystal layer;
      (ii) when the voltage applied between the electrodes is at a second voltage which is different from the first voltage, the liquid crystal display device displays a specific color corresponding to the specific band of the visible light band which is not polarized by the color polarizing plate, in accordance with the other of the optical rotation by the liquid crystal layer and the cancelling of the optical rotation by the liquid crystal layer; and (iii) when the voltage applied between the electrodes is at a third voltage which is between the first voltage and the second voltage, the liquid crystal display device displays a black color having an intensity of light emission lower than that of the white color and corresponding to the substantial whole band of the visible light band, in accordance with a control of elliptical polarization by the liquid crystal layer; and thereby the liquid crystal display device performs display of three colors of the white color, the black color and the specific color corresponding to the specific band.

2. The device according to claim 1, wherein the liquid crystal molecules of the liquid crystal layer are twisted between the pair of substrates at substantially a twisted angle of 90°, and wherein the first transmission axis of the normal polarizing plate and the second transmission axis of the color polarizing plate are arranged so as to be substantially perpendicular to each other.

3. The device according to claim 1, wherein the liquid crystal molecules of the liquid crystal layer are twisted between the pair of substrates at substantially a twisted angle of 90°, and wherein the first transmission axis of the normal polarizing plate and the second transmission axis of the color polarizing plate are arranged so as to be substantially parallel to each other.

4. The device according to claim 1, wherein the color polarizing plate comprises a red color polarizing plate having a polarizing function of transmitting the component oscillating in the direction parallel to the direction of the second transmission axis, and absorbing the light component oscillating in the direction perpendicular to the direction of the second transmission axis, for light of the wavelength band other than a wavelength band corresponding to red in the visible light, and wherein the color polarizing plate is configured to perform display of three colors including red in the wavelength band not polarized by the red color polarizing plate, substantial white with which an intensity of emerging light of the substantial whole band of the visible light wavelength band is high, and substantial black with which the intensity of the emerging light of substantially the whole band of the visible light wavelength band is low.

5. The device according to claim 1, further comprising a diffusion film that diffuses incident light and outputs diffused light and is arranged between the opposite side substrate and the color polarizing plate.

6. A liquid crystal display device comprising:
a pair of substrates including an observation side substrate and an opposite side substrate that are arranged to oppose each other with a predetermined gap;
a liquid crystal layer that is sealed in the gap between the pair of substrates and includes liquid crystal molecules that are twisted between the pair of substrates substantially at a twisted angle of 90°;
electrodes that are respectively provided on inner surfaces of the pair of substrates that oppose the liquid crystal layer and to which a voltage to control an aligned state of the liquid crystal molecules is applied at opposing regions;
a normal polarizing plate that: (i) is arranged on an outer surface of the observation side substrate so that a first transmission axis of the normal polarizing plate is substantially parallel to an aligning direction of the liquid crystal molecules in a vicinity of the observation side substrate, and (ii) transmits a light component oscillating in a direction parallel to a direction of the first transmission axis, and absorbs a light component oscillating in a direction perpendicular to the direction of the first transmission axis, among wavelength light of a substantial whole band of a visible light band;
a red color polarizing plate that: (i) is arranged on an outer surface of the opposite side substrate so that a second transmission axis of the red polarizing plate is substantially parallel to an aligning direction of liquid crystal molecules in a vicinity of the opposite side substrate, and (ii) transmits a light component oscillating in a direction parallel to a direction of the second transmission axis, and absorbs a light component oscillating in a direction perpendicular to the direction of the second transmission axis, among wavelength light in a band of the visible light band excluding a band corresponding to red; and
a reflecting plate which is arranged on a surface of the red color polarizing plate that is opposite to a surface that faces the opposite side substrate, and which reflects light entering from the observation side to the observation side, wherein:
(i) when the voltage applied between the electrodes is at a first voltage, the liquid crystal display device displays a white color corresponding to the substantial whole band of the visible light band, in accordance with an optical rotation by the liquid crystal layer;
(ii) when the voltage applied between the electrodes is at a second voltage which is higher than the first voltage, the liquid crystal display device displays the red color corresponding to the band of the visible light band which is not Polarized by the red color polarizing plate, in accordance with cancelling of the optical rotation by the liquid crystal layer; and
(iii) when the voltage applied between the electrodes is at a third voltage which is between the first voltage and the second voltage, the liquid crystal display device displays a black color having an intensity of light emission lower than that of the white color and corresponding to the substantial whole band of the visible light band, in accordance with a control of elliptical polarization by the liquid crystal layer; and thereby the liquid crystal display device performs display of three colors of the white color, the black color and the red color.

7. The device according to claim 1, wherein when the voltage applied between the electrodes is between the first voltage and the third voltage, or when the voltage applied between the electrodes is between the third voltage and the second voltage, a brightness of the white color or a brightness of the specific color corresponding to the specific band changes.

8. The device according to claim 1, wherein the liquid crystal layer contains the liquid crystal molecules having a positive dielectric anisotropy.

9. The device according to claim 1, wherein the liquid crystal display device performs reflection display based on external light entering from a side of the normal polarization plate.

10. The device according to claim 6, wherein when the voltage applied between the electrodes is between the first voltage and the third voltage, a brightness of the white color changes, and when the voltage applied between the electrodes is between the third voltage and the second voltage, a brightness of the red color changes.

11. The liquid crystal display device according to claim 6, wherein a value of a product Δnd of a liquid crystal anisotropic refractive index Δn and a liquid crystal layer thickness d of the liquid crystal layer is set at such an angle that, in an initial alignment state in which the liquid crystal molecules are twisted between the pair of substrates at the twisted angle of substantially 90°, linearly polarized light having a wavelength of 550 nm is rotated through substantially 90° with reference to 550 nm as a halftone wavelength of a halftone wavelength band of the visible light band.

12. The device according to claim 6, further comprising a diffusion film which diffuses incident light and outputs diffused light, and which is arranged between the opposite side substrate and the red color polarizing plate.

13. The device according to claim 6, wherein the liquid crystal layer contains the liquid crystal molecules having a positive dielectric anisotropy.

14. The device according to claim 6, wherein the liquid crystal display device performs reflection display based on external light entering from a side of the normal polarization plate.

* * * * *